United States Patent [19]

Beckemeyer et al.

[11] Patent Number: 5,024,515
[45] Date of Patent: Jun. 18, 1991

[54] ORNAMENTS FOR EYE GLASSES

[76] Inventors: Steven D. Beckemeyer; Lynn M. Beckemeyer, both of 335 Midridge, St. Louis, Mo. 63137

[21] Appl. No.: 339,512

[22] Filed: Apr. 17, 1989

[51] Int. Cl.⁵ .................... G02C 11/02; G02C 1/00
[52] U.S. Cl. ................................... 351/52; 351/158
[58] Field of Search ...................... 351/51, 52, 158

[56] References Cited

U.S. PATENT DOCUMENTS

| | | | |
|---|---|---|---|
| 2,682,724 | 1/1954 | Pattillo | 351/52 |
| 2,960,787 | 11/1960 | Quinones | 351/52 |
| 2,966,541 | 10/1956 | Quinones | 351/51 |
| 3,010,365 | 11/1961 | Sadel | 351/52 |
| 4,045,131 | 8/1977 | Sherman | 351/52 |
| 4,153,346 | 5/1979 | Gomer | 351/52 |
| 4,620,778 | 11/1986 | Bertolli | 351/52 |

Primary Examiner—Rodney B. Bovernick
Attorney, Agent, or Firm—Andsel Group

[57] ABSTRACT

A device for readily attaching, or detaching, a decorative ornament to all types of plastic or wire eye glass frames. The attaching device being an overlapping wrap around ring of spring metal wire having the ends of the wire on the inside surface of the eye glass frame formed to press on the frame to hold the ring in place.

1 Claim, 1 Drawing Sheet

ORNAMENTS FOR EYE GLASSES

BACKGROUND OF THE INVENTION

1. Field of the Invention

Ornamentation of eye glass frames by attaching decorative ornaments to the frames at, or near, the front corners where the ear support portion of the frames are attached to the lens support portion of the frames has been popular for many years.

2. Description of the Prior Art

Designs described in the prior art are based upon eyeglasses constructed of plastic material wherein the frames have sufficient cross section to employ invasive mechanical attachments for supporting ornaments.

This type of attachement means is described in U.S Pat. Nos. 2,766,541 and 2,969,787 issued to Quinones et al in 1952. Somewhat similar devices are described in the following U.S. Pat. Nos.: 2,682,724 Pattilo; 4,045,131 Sherman; 4,153,346 Gomer; and 4,620,778. These designs are not adapted to wire frame glasses or to the readily attaching and removing of the ornament supports from the eye glass frames.

SUMMARY OF THE INVENTION

The eyeglass attaching means of the present invention is readily removable and attachable to any type of eye glass frame. A large assortment of ornaments using a metal attaching ring on the top can be supported so as to dangle from the eye glass frame by a spring metal split ring attaching means. The spring metal ring can be spread open to pass over the eye glass frame and to attach the the ornament support ring. The ends of the split ring overlapping on the inside of the eye glass frame are bent inwards to press upon the frame to secure the ring in place.

The inside curvature of the split ring generally conforming to the shape of the eyeglass frame except on the bottom where it forms a round point leaving room for the ornament support ring.

In use the ornament support ring is slipped over the wire in the split ring and then the split ring is forced open sufficiently to encircle the eye glass frame. The split ring is then slidably adjusted to the desired location on the frame.

The split ring provided in sizes to fit both the plastic frame and wire frame eye glasses.

DETAILED DESCRIPTION OF THE PREFERRED EMBODIMENT

Figures 1, 2:
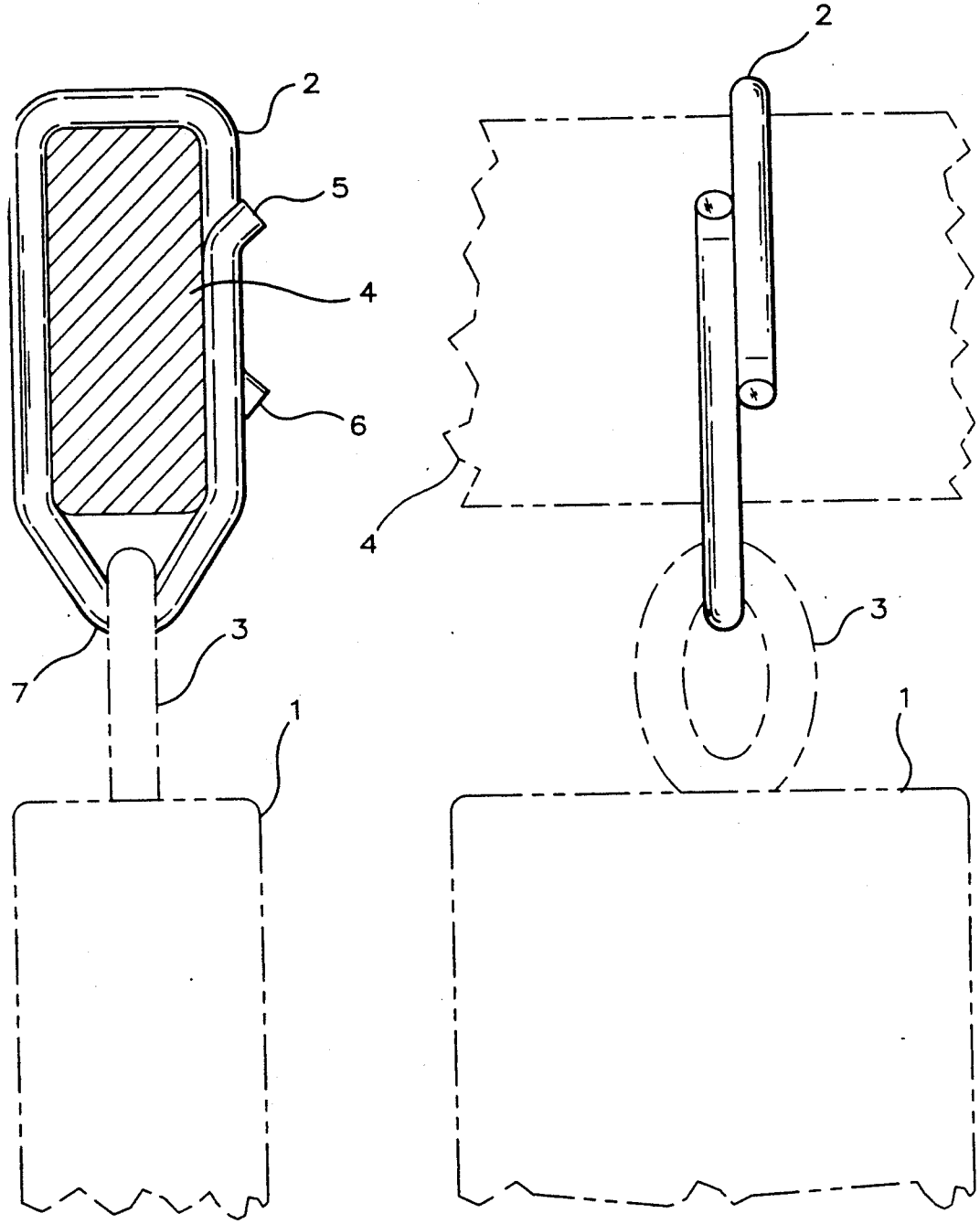
FIG. 1 is a sectional view of the eye glass frame with the split ring and ornament attached.
FIG. 2 is a side view of the eye glass frame with the split ring and ornament attached.

Referring to FIG. 1 the split ring 2 is shown clamped to the eye glass frame 4 by pressure of the inwardly formed ends 5 and 6 of the split ring 2. The top of the split ring and the sides of the split ring are shaped to conform generally with the outside contour of the eye glass frame 4 the bottom portion of the ring 2 tapering to a rounded point 7 having sufficient clearance for the ornament support ring to pass between the split ring 2 and the bottom of the eye glass frame 4.

In use the ornament support ring is attached to the split ring 2 by forcing it between the ring ends 5 and 6 then the ring 2 is held open to slide the ring 2 over the frame 4. The ring 2 is then slidably adjusted to the desired location, the pressure of the ring ends 5 and 6 on the frame 4 holding it in place.

We claim:

1. A spring metal fixture for readily attaching and removing a dangling ornament from the frames of eye glasses, in combination with eyeglasses wherein the improvement comprises:

(a), a decorative ornament having a support ring attached to the top for attaching the ornament to the eye glass frame;

(b), a single turn of spring metal wire wrapped around the eye glass frame with the ends over lapping on the inside portion of the eye glass frame;

(c), the ends of the spring wire formed inwards to press upon the eye glass frame;

(d), the spring wire conforming to the contour of the eye glass frame except on the bottom where is tapers to a rounded point;

(e), the ring having space between the inside circumference and the bottom of the eye glass frame to accommodate the ornament support ring; and, (f), the spring wire ring with the ornament attached being slidably adjustable along the eye glass frame.

* * * * *